US009650466B2

(12) United States Patent
Shutov

(10) Patent No.: US 9,650,466 B2
(45) Date of Patent: *May 16, 2017

(54) COMPOSITE MATERIAL INCLUDING RIGID FOAM WITH INORGANIC FILLERS

(71) Applicant: CertainTeed Corporation, Malvern, PA (US)

(72) Inventor: Fyodor A. Shutov, Anaheim, CA (US)

(73) Assignee: CERTAINTEED CORPORATION, Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/067,992

(22) Filed: Mar. 11, 2016

(65) Prior Publication Data

US 2016/0194432 A1    Jul. 7, 2016

Related U.S. Application Data

(63) Continuation of application No. 11/190,760, filed on Jul. 27, 2005, now Pat. No. 9,315,612.

(51) Int. Cl.
| | | |
|---|---|---|
| *C08G 18/48* | (2006.01) |
| *C08G 18/08* | (2006.01) |
| *C04B 26/16* | (2006.01) |
| *C08J 9/00* | (2006.01) |
| *C08G 18/16* | (2006.01) |
| *C08G 18/76* | (2006.01) |
| *C08K 3/00* | (2006.01) |
| *C08K 7/14* | (2006.01) |
| *C04B 111/54* | (2006.01) |
| *C08G 101/00* | (2006.01) |

(52) U.S. Cl.
CPC .............. *C08G 18/14* (2013.01); *C04B 26/16* (2013.01); *C08G 18/0838* (2013.01); *C08G 18/165* (2013.01); *C08G 18/48* (2013.01); *C08G 18/4804* (2013.01); *C08G 18/7664* (2013.01); *C08J 9/0066* (2013.01); *C08J 9/0095* (2013.01); *C08K 3/0033* (2013.01); *C08K 7/14* (2013.01); *C04B 2111/54* (2013.01); *C08G 2101/0025* (2013.01); *C08G 2101/0058* (2013.01); *C08G 2101/0083* (2013.01); *C08J 2205/10* (2013.01); *C08J 2375/04* (2013.01); *C08J 2375/08* (2013.01); *Y02W 30/92* (2015.05)

(58) Field of Classification Search
CPC ........ C08G 18/4804; C08G 2101/0083; C04B 26/16; C04B 2111/54; C08J 9/0066; C08J 2375/04; Y02W 30/92
See application file for complete search history.

(56) References Cited

U.S. PATENT DOCUMENTS

| | | | |
|---|---|---|---|
| 3,499,848 A | 3/1970 | Weisman | |
| 4,164,526 A | 8/1979 | Baker et al. | |
| 4,661,533 A | 4/1987 | Stobby | |
| 5,278,195 A | 1/1994 | Volkert et al. | |
| 5,302,634 A | 4/1994 | Mushovic | |
| 5,369,147 A | 11/1994 | Mushovic | |
| 5,489,646 A * | 2/1996 | Tatman .................. C08F 136/06 524/474 |
| 5,604,266 A | 2/1997 | Mushovic | |
| 5,698,609 A | 12/1997 | Lockwood et al. | |
| 5,798,533 A | 8/1998 | Fishback et al. | |
| 6,044,512 A | 4/2000 | Hornby et al. | |
| 6,060,531 A | 5/2000 | Horn et al. | |
| 6,107,355 A * | 8/2000 | Horn .................... C08G 18/242 521/121 |
| 6,136,870 A | 10/2000 | Triolo et al. | |
| 6,187,892 B1 | 2/2001 | Markusch et al. | |
| 6,422,926 B1 | 7/2002 | McLain et al. | |
| 6,832,430 B1 * | 12/2004 | Ogawa .................. B05B 15/045 29/428 |
| 2004/0014830 A1 | 1/2004 | Wiese et al. | |
| 2005/0163969 A1 * | 7/2005 | Brown ............... C08G 18/0895 428/151 |
| 2007/0027227 A1 | 2/2007 | Shutov | |

FOREIGN PATENT DOCUMENTS

| | | |
|---|---|---|
| AU | 2005208714 A1 | 8/2005 |
| EP | 0341210 A1 | 1/1993 |
| WO | 9113112 A1 | 9/1991 |
| WO | 9851736 A1 | 11/1998 |
| WO | 9907761 A1 | 2/1999 |
| WO | 0008083 A1 | 2/2000 |
| WO | 0220261 A2 | 3/2002 |
| WO | 2005072188 A2 | 8/2005 |

OTHER PUBLICATIONS

International Search Report for Application No. PCT/US2006/029429, dated Nov. 23, 2007, 2 pages.
European Extended Search Report for Application No. 06788801.6, dated May 5, 2010, 1 page.

* cited by examiner

*Primary Examiner* — John Cooney
(74) *Attorney, Agent, or Firm* — Abel Law Group, LLP; Alexander H Plache

(57) ABSTRACT

A composite material includes, in an exemplary embodiment a polyurethane foam and a plurality of inorganic particles dispersed therein. The polyurethane foam is formed from a reaction mixture that includes a first polyether polyol having a first molecular weight and a functionality of about 3 or less, a second polyether polyol having a second molecular weight less than the first molecular weight and a functionality of greater than about 3, and at least one isocyanate. The ratio of an amount of the first polyol in the reaction mixture to an amount of the second polyol in the reaction mixture is between about 1:1 to about 5:1.

16 Claims, No Drawings

COMPOSITE MATERIAL INCLUDING RIGID FOAM WITH INORGANIC FILLERS

CROSS-REFERENCE TO RELATED APPLICATION(S)

This application is a continuation and claims priority to U.S. patent application Ser. No. 11/190,760 entitled "Composite Material Including Rigid Foam With Inorganic Fillers," by Fyodor A. Shutov, filed Jul. 27, 2005, which is assigned to the current assignee hereof and incorporated herein by reference in its entirety.

BACKGROUND OF THE INVENTION

This invention relates generally to composite materials, and more particularly, to composite materials based on rigid polyurethane foams and reinforcing mineral fillers.

Polyurethane foams are commonly prepared by reacting isocyanate with hydrogen-containing compounds having reactive hydroxyl groups, for example, polyester or polyether polyols. The reaction occurs in the presence of a catalyst, and a blowing agent is provided in order to produce an expanded, cellular product. The blowing agent can be produced chemically by the interaction of the isocyanate with water to generate $CO_2$ gas. In low density, high expanding systems, a blowing agent such as trichlorofluoromethane is added which vaporizes at the outset of the reaction. Polyurethane foam systems are commonly prepared as two components, the isocyanate component being maintained separate from the polyol-catalyst-blowing agent component until the time of use.

Structural articles formed from polyurethane foams usually include fillers to increase the strength of the polyurethane foam. U.S. Pat. No. 4,661,533 to Stobby describes a rigid polyurethane modified polyisocyanurate foam containing fly ash as a filler that is used for building insulation. However, structural building products, for example synthetic lumber, require higher density foams than those taught by Stobby.

BRIEF DESCRIPTION OF THE INVENTION

In one aspect, a composite material is provided that includes a polyurethane foam and a plurality of inorganic particles dispersed therein. The polyurethane foam is formed from a reaction mixture that includes a first polyether polyol having a first molecular weight and a functionality of about 3 or less, a second polyether polyol having a second molecular weight less than the first molecular weight and a functionality of about 3 or greater, and at least one isocyanate. The ratio of an amount of the first polyol in the reaction mixture to an amount of the second polyol in the reaction mixture is between about 1:1 to about 5:1.

In another aspect, a synthetic lumber article is provided that includes a composite material. The composite material includes a polyurethane foam and a plurality of inorganic particles dispersed therein. The polyurethane foam is formed from a reaction mixture that includes a first polyether polyol having a first molecular weight and a functionality of about 3 or less, a second polyether polyol having a second molecular weight that is less than the first molecular weight and a functionality of about 3 or greater, and at least one isocyanate. The ratio of an amount of the first polyol in the reaction mixture to an amount of the second polyol in the reaction mixture is between about 1:1 to about 5:1.

In another aspect, a method of producing a composite material including a polyurethane foam and a plurality of inorganic particles dispersed therein is provided. The method includes mixing a first polyether polyol having a first molecular weight and a functionality of about 3 or less with a second polyether polyol having a second molecular weight which is less than the first molecular weight and a functionality of about 3 or greater to form a polyol mixture wherein a ratio of an amount of the first polyol in the mixture to an amount of the second polyol in the mixture is between about 1:1 to about 5:1. The method also includes adding a plurality of inorganic particles to the mixture where the plurality of inorganic particles are present in amount of about 30 weight percent to about 85 weight percent, the weight percent based on the total weight of the mixture, and adding at least one isocyanate to the polyol mixture.

DETAILED DESCRIPTION OF THE INVENTION

A composite material that is formed from a thermosetting polyurethane binder and a plurality of inorganic fillers dispersed therein is described in detail below. The polyurethane foam binder is formed from the reaction of two or more polyether polyols with aromatic isocyanates. The mineral fillers can be particulate materials, for example, fly ash, bottom ash, fine sand, ceramic particles, and glass particles, and/or mineral fibers, for example, glass fibers, graphite fibers, carbon fibers, ceramic fibers, vermiculite fibers, basalt fibers, and vallostonite fibers, as well as inorganic fibers. The composite material can be formed into any shape and be used for a replacement of natural wood as an artificial or synthetic lumber. For example, the composite material is suitable for use as railroad ties, roof shingles, siding for homes, fence posts, window and door frames, and also a replacement for some ceramic and concrete building materials. The composite material exhibits high flexural strength and impact resistance along with low thermal expansion and contraction compared to natural and known synthetic wood. The composite material also exhibits higher fire resistance and lower water absorption compared to natural and known synthetic wood.

The composite material, in an exemplary embodiment, is formed from a reaction mixture containing liquid and solid components. The liquid components include two or more polymeric and/or oligomeric polyether polyols, polymeric, oligomeric, or monomeric polyisocyanates, amine catalysts, organometallic catalysts, and a blowing agent. The liquid components can also include surfactants, wetting agents, plasticizers, light and heat stabilizers and antioxidants, flame retardants, mold release agents, and antistatic agents. Solid components of the reaction mixture include particulate and/or filament mineral and/or organic fillers, chopped and/or milled reinforcing fibers, and pigments. The solid components can also include light and heat stabilizers and antioxidants, antistatic agents, mold release agents, and flame retardants.

Polyether polyols used to form the composite material include low-viscosity polyether polyols having a first molecular weight and a functionality of about 3 or less, and in one embodiment, a functionality from about 2 to about 3. Also, polyether polyols having a second molecular weight lower than the first molecular weight and a functionality of about 3 or greater are used in the reaction mixture where greater than 50 weight percent of the polyols in the mixture has a functionality of 3 or less. Particularly, in one embodiment, the ratio of the weight of polyether polyols having a functionality of about 3 or less to the weight of polyether polyols having a functionality of about 3 or greater is about 1:1 to about 5:1, and in another embodiment from about 1.5:1 to about 3.0:1. Polyether polyols with a functionality of about 3 or less provide flexibility to the composite material while polyether polyols with a functionality of greater than about 3 provide rigidity to the composite material.

Suitable polyether polyols include, but are not limited to, polypropylene glycol, polyethylene glycol, polytetramethylene ether glycol, glycerol, neopentyl glycol, 1,2-pentane diol, pentaerythritol adducts, 1,6-hexane diol, 1,3-butylene glycol, trimethylolpropane adducts, trimethylolethane adducts, ethylendiamine adducts, and diethylenetriamine adducts. Polyether polyols are commercially available from, for example, Bayer Corporation under the trademark MULTRANOL.

Useful polyisocyanates include aromatic polyisocyanates. Suitable examples of aromatic polyisocyanates include 4,4-diphenylmethane diisocyanate (methylene diphenyl diisocyanate), 2,4- or 2,6-toluene diisocyanate, including mixtures thereof, p-phenylene diisocyanate, tetramethylene and hexamethylene diisocyanates, 4,4-dicyclohexylmethane diisocyanate, isophorone diisocyanate, mixtures of 4,4-phenylmethane diisocyanate and polymethylene polyphenylisocyanate. Higher polyisocyanates such as triisocyanates can be used, for example, 4,4,4-triphenylmethane triisocyanate 1,2,4-benzene triisocyanate; polymethylene polyphenyl polyisocyanate; and methylene polyphenyl polyisocyanate. Isocyanates are commercially available from Bayer USA, Inc. under the trademarks MONDUR and DESMODUR. The ratio of isocyanate to polyol (isocyanate index), based on equivalent weights of OH groups (hydroxyl index) and NCO groups, in one embodiment, range from about 0.5:1 to about 1.5:1, and in another embodiment, from about 0.8:1 to about 1.2:1.

In the exemplary embodiment, two different catalysts are used. A first catalyst (gel catalyst) is selected to promote the gelling raction between hydroxyl and isocyanate groups and accelerate curing of the system, for example, amine catalysts. Suitable amines can include primary, secondary, and tertiary amines. Some examples of amines include, but are not limited to, diisopropanolamine, triethanolamine, triethylamine, monoethanolamine, dimethylethylamine, dimethylethanolamine, and 2-amino-2-methylpropanol triethylene diamine. The amount of amine catalyst ranges from about 0.01 weight percent to about 0.1 weight percent A second catalyst (foaming catalyst) is selected to promote the reaction between water and isocyanate groups and accelerate generation of $CO_2$ used as a blowing agent to foam the system, for example, organometallic catalysts, including carboxylates and mercatides. Some non-limiting examples of organometallic catalysts include organotin compounds, including dibutyltin dilaurate and dibutyltin oxide. The amount of organometallic catalyst ranges from about 0.001 weight percent to about 0.01 weight percent. In other embodiments, more than two catalysts can be used. Further, both the gel and foaming catalysts can be delayed action catalysts to extend curing and/or foaming time, for example, UL-29 and A-530 catalysts, commercially available from General Electric Company.

Surfactants and wetting agents can be added to the reaction mixture to facilitate the mixing of the solid components into the liquid components of the reaction mixture. Anionic and cationic surfactants can be used, for example, silicone surfactants, such as DC-197 or DC-193 commercially available from Air Products, Inc, or Niax Silicone L-1602 commercially available from General Electric Company. The amount of surfactant used is about 0.5 weight percent or less.

A blowing agent is used to facilitate the foaming of the polyurethane binder and to control the density of the composite material. Organic blowing agents, for example, halogenated hydrocarbons, hexanes, and fluorocarbons can be used. Also, water can be used as a blowing agent because of the formation of carbon dioxide from the reaction of water and isocyanate. When water is used as the blowing agent, from about 0.1 weight percent to about 3.0 weight percent of water is added to the reaction mixture. Varying the amount of blowing agent used facilitates controlling the density of the composite material. In one embodiment, the density of the composite material is about 20 pounds per cubic foot (lbs/ft$^3$) to about 90 lbs/ft$^3$, and in another embodiment from about 30 lbs/ft$^3$ to about 75 lbs/ft$^3$.

As explained above, the solid components of the reaction mixture include particulate mineral fillers, chopped and/or milled reinforcing fibers, and pigments. The particulate mineral fillers add strength to the composite material and, in one embodiment, are present in the reaction mixture from about 30 weight percent to about 85 weight percent, and in another embodiment, from about 50 weight percent to about 85 weight percent. Suitable particulate mineral fillers include, for example, fly ash, bottom ash, fine sand, ceramic particle, glass particles, and mixtures thereof. A broad particle size distribution of particulate mineral fillers can provide for particulate packing which facilitates incorporating high levels of particles in the reaction mixture and the composite material. Particle size distributions of the particulate mineral fillers, in one embodiment, range from about 5 µm to about 200 µm, and in another embodiment, from about 20 µm to about 50 µm.

Suitable reinforcing fibers for use in forming the composite material include, but are not limited to, inorganic fibers, glass fibers, graphite fibers, carbon fibers, ceramic fibers, vermiculite fibers, basalt fibers, vallostonite fibers, and mixtures thereof. When reinforcing fibers are present in the composite material, they are present in amount ranging between about 1.0 weight percent to about 15 weight percent.

To provide a uniform color to the composite material, pigments can be added to the reaction mixture in amounts ranging from about 1.0 weight percent to about 15 weight percent. Any suitable mineral or organic pigment or mixtures of pigments can be incorporated into the composite material, for example, iron oxide, titanium dioxide, and carbon black. Other additives can be added to the reaction mixture to provide desired properties to the composite materials, for example, heat stabilizers, light stabilizers, and antioxidants.

To provide for uniform mixing of the solid components with minor quantities of liquid components, and thereby control mechanical properties and density, plasticizers/lubricants can be added up to about 5 weight percent. Suitable plasticizers include viscose natural or synthetic aromatic hydrocarbons, or mixtures of aromatic and non-aromatic hydrocarbons, for example, VYCEL, commercially available from Crowley Chemical Co.

As explained above, the composite material is formed from a reaction mixture containing liquid and solid components. The solid components are pre-blended with the liquid components, minus the isocyantes, in any suitable mixing equipment, for example, mixing tanks and extruders. It is important that the solid components, such as the mineral filler particles, the pigments, and the reinforcing fibers, are uniformly dispersed in the liquid components, such as the polyether polyols. After these liquid and solid components are thoroughly mixed, the isocyanate is added to start the foaming and curing reactions. The mixture is then poured into a mold or onto a conveyorized continuous mold for final foaming, curing, solidification, texturing of the surface of the composite material, and cutting to length.

The above described composite material can be molded into any shape containing any desired surface texture and be used for a replacement of natural wood as an artificial or synthetic lumber. For example, the composite material is suitable for use as railroad ties, roof shingles, siding for homes, fence posts, window and door frames, and also a replacement for some ceramic and concrete building materials. The composite material exhibits high flexural strength and impact resistance along with low thermal expansion and contraction compared to wood. The composite material also exhibits high fire resistance and low water absorption compared to wood. Also, the rigidity of composite material can be varied by varying the ratio of the rigid and flexible polyether polyols. The strength and impact resistance can also be varied by adjusting the relative amounts of particulate fillers and reinforcing fibers.

The invention will be further described by reference to the following examples which are presented for the purpose of illustration only and are not intended to limit the scope of the invention. Unless otherwise indicated, all amounts are listed as parts by weight.

EXAMPLES 1-4

Examples 1 through 4 compare varying the first polyol to the second polyol ratios of 1.4:1, 1.3:1, 1.2:1, and 1.1:1 respectively. The composite materials of Examples 1-4 listed below in Table 1 were prepared by mixing the following materials in an extruder at room temperature. Each resulting composite material was extruded through an extruder head into a mold under pressure. The composite material was cooled and removed from the mold.

EXAMPLES 5-6

Examples 5 and 6 compare varying a isocyanate index of 1.051 and 1.180 at a constant ratio of 1.2 of the first polyol to the second polyol. The composite materials of Examples 5 and 6 listed below in Table 2 were prepared by mixing the following materials in an extruder at room temperature. Each resulting composite material was extruded through an extruder head into a mold under pressure. The composite material was cooled and removed from the mold.

TABLE 2

| Component | Example 5 | Example 6 | Product |
|---|---|---|---|
| First Polyol | 225.0 | 225.0 | Acclaim 703 |
| Second Polyol | 187.5 | 187.5 | Multranol 4035 |
| Polyol Ratio: | 1.20 | 1.20 | |
| Polymeric MDI | 326.1 | 366.1 | Mondur MR (Light) |
| Isocyanate Index | 1.051 | 1.180 | |
| Surfactant | 3.85 | 3.85 | Niax Silicone L-1602 |
| Water | 2.00 | 2.00 | |
| Plasticizer | 23.12 | 18.24 | Vycel-U |
| Catalyst 1 | 0.50 | 0.49 | UL-29 |
| Catalyst 2 | 1.20 | 1.20 | A-530 |
| Pigment | 148 | 148 | BN-2530 |
| Fiberglass | 348 | 278 | 366-113 OCF |
| Fly Ash | 2160 | 2160 | Navajo Fly Ash |
| Total Weight | 3425.27 | 3390.38 | |

| General Properties | Example 5 | Example 6 |
|---|---|---|
| Density (lb/ft$^3$) | 45.6 | 52.9 |
| Avg. Flex Stress (psi) | 1918 | 3629 |
| Flex/Density Ratio | 42 | 69 |
| Flex Modulus (Kpsi) | 322 | 667 |
| Impact Avg. (ft/lbs.) | 48 | 129 |

TABLE 1

| Component | Example 1 | Example 2 | Example 3 | Example 4 | Product |
|---|---|---|---|---|---|
| First Polyol | 225.0 | 225.0 | 225.0 | 225.0 | Acclain 703[1] |
| Second Polyol | 160.4 | 173.1 | 187.5 | 204.5 | Multranol 4035[1] |
| Polyol Ratio: | 1.40 | 1.30 | 1.20 | 1.10 | |
| Polymeric MDI | 332.6 | 345.6 | 363.5 | 381.2 | Mondur MR (Light)[1] |
| Isocyanate Index | 1.120 | 1.120 | 1.110 | 1.133 | |
| Surfactant | 3.85 | 3.85 | 3.85 | 3.85 | Niax Silicone L-1602[2] |
| Water | 2.00 | 2.00 | 2.42 | 2.00 | |
| Plasticizer | 18.24 | 18.24 | 23.16 | 18.24 | Vycel-U[3] |
| Catalyst 1 | 0.56 | 0.79 | 0.59 | 0.79 | UL-29[2] |
| Catalyst 2 | 1.45 | 1.20 | 1.73 | 1.20 | A-530[2] |
| Pigment | 148 | 148 | 148 | 148 | BN-2530[4] |
| Fiberglass | 278 | 278 | 278 | 278 | 366-113 OCF[5] |
| Fly Ash | 1911 | 2110 | 2160 | 2060 | Navajo Fly Ash[6] |
| Total Weight | 3081.10 | 3305.78 | 3393.75 | 3322.78 | |

| General Properties | Example 1 | Example 2 | Example 3 | Example 4 |
|---|---|---|---|---|
| Density (lb/ft$^3$) | 47.9 | 52.1 | 45.9 | 43.6 |
| Avg. Flex Stress (psi) | 2330 | 3223 | 2948 | 3048 |
| Flex/Density Ratio | 49 | 62 | 64 | 70 |
| Flex Modulus (Kpsi) | 543 | 674 | 656 | 805 |
| Impact Avg. (ft/lbs.) | 116 | 145 | 132 | 129 |

[1] Commercially available from Bayer Corporation.
[2] Commercially available from General Electric Company.
[3] Commercially available from Crowley Chemical Corporation.
[4] Commercially available from Interstar Corporation.
[5] Commercially available from Ashland Chemical Company.
[6] Commercially available from Headwater Resources Company.

EXAMPLES 7-8

Examples 7 and 8 compares the effect of a plasticizer at a constant isocyanate index of 1.028 and at a constant ratio of 1.8 of the first polyol to the second polyol. The composite materials of Examples 7 and 8 listed below in Table 3 were prepared by mixing the following materials in an extruder at room temperature. Each resulting composite material was extruded through an extruder head into a mold under pressure. The composite material was cooled and removed from the mold.

TABLE 3

| Component | Example 7 | Example 8 | Product |
|---|---|---|---|
| First Polyol | 225.0 | 225.0 | Acclaim 703 |
| Second Polyol | 125.0 | 125.0 | Multranol 4035 |
| Polyol Ratio: | 1.80 | 1.80 | |
| Polymeric MDI | 302.0 | 306.7 | Mondur MR (Light) |
| Isocyanate Index | 1.028 | 1.028 | |
| Surfactant | 3.00 | 3.00 | Niax Silicone L-1602 |
| Water | 2.58 | 2.40 | |
| Plasticizer | 0.00 | 33.00 | V895BL |
| Catalyst 1 | 0.49 | 0.80 | UL-29 |
| Catalyst 2 | 0.88 | 0.69 | A-530 |
| Pigment | 125 | 125 | BN-2530 |
| Fiberglass | 278 | 348 | 366-113 OCF |
| Fly Ash | 1910 | 1910 | Navajo Fly Ash |
| Total Weight | 2971.95 | 3079.59 | |

| General Properties | Example 7 | Example 8 |
|---|---|---|
| Density (lb/ft$^3$) | 43.6 | 44.4 |
| Avg. Flex Stress (psi) | 1528 | 2201 |
| Flex/Density Ratio | 35 | 50 |
| Flex Modulus (Kpsi) | 435 | 400 |
| Impact Avg. (ft/lbs.) | 76 | 130 |

While the invention has been described in terms of various specific embodiments, those skilled in the art will recognize that the invention can be practiced with modification within the spirit and scope of the claims.

What is claimed is:

1. A composite material usable as synthetic lumber, comprising a polyurethane foam and a plurality of inorganic particles dispersed therein, wherein:
   the polyurethane foam is formed from a reaction mixture comprising at least one polyisocyanate, a first flexible polyether polyol having a first molecular weight and a functionality of about 3 or less, and a second rigid polyether polyol having a second molecular weight and a functionality of about 3 or greater, wherein the second molecular weight is less than the first molecular weight, and a wt % ratio of the first flexible polyol to the second rigid polyol ranges from about 1:1 to about 5:1;
   the plurality of inorganic particles is present in an amount of about 50 wt % to about 85 wt % based on the total weight of the composite material, the inorganic filler particles including fly ash and glass fibers;
   the composite material has a density in a range from about 30 lbs/ft$^3$ to about 52.1 lbs/ft$^3$; and
   the composite material has an average flexural stress of at least 2330 psi.

2. The composite material of claim 1, wherein the glass fibers are present in an amount of 1 wt % to about 15 wt % based on the total weight of the composite material.

3. The composite material of claim 1, wherein the reaction mixture further comprises a first catalyst comprising an amine compound, and a second catalyst comprising an organometallic compound.

4. The composite material of claim 3, wherein the first catalyst comprises a tertiary amine, and the second catalyst comprises an organotin compound.

5. The composite material of claim 1, wherein the reaction mixture further comprises an aromatic hydrocarbon in an amount of up to 5 wt % based on the total weight of the composite material.

6. The composite material of claim 1, wherein the inorganic particles further comprise at least one of a bottom ash, fine sand, ceramic particles, glass particles, graphite fibers, carbon fibers, ceramic fibers, vermiculite fibers, basalt fibers, vallostonite fibers, or any combination thereof.

7. A method of producing a composite material usable as synthetic lumber, comprising a polyurethane foam and a plurality of inorganic particles dispersed therein, the method comprising:
   mixing a first flexible polyether polyol having a first molecular weight and a functionality of about 3 or less with a second rigid polyether polyol having a second molecular weight and a functionality of about 3 or greater to form a polyol mixture, wherein a ratio of an amount of the first polyol in the mixture to an amount of the second polyol in the mixture is between about 1:1 to about 5:1, the second molecular weight less than the first molecular weight;
   adding up to about 5 weight percent based on the total weight of the composite material of an aromatic hydrocarbon;
   adding an amount of about 50 wt % to about 85 wt % of the plurality of inorganic particles to the mixture, the plurality of inorganic particles include fly ash and glass fibers, adding at least one polyisocyanate to the polyol mixture; and
   extruding the mixture into a mold to form a composite material having a density from about 30 lbs/ft$^3$ to about 52.1 lbs/ft$^3$ and an average flexural stress of at least 2330 psi.

8. The method of claim 7, wherein the glass fibers are present in an amount of 1 wt % to about 15 wt % based on the total weight of the composite material.

9. The method of claim 7, wherein the reaction mixture further comprises a blowing agent.

10. The method of claim 9, wherein the blowing agent comprises water.

11. The method of claim 7, wherein the reaction mixture further comprises a first catalyst comprising an amine compound, and a second catalyst comprising an organometallic compound.

12. The method of claim 11, wherein the first catalyst comprises a tertiary amine, and the second catalyst comprises an organotin compound.

13. The method of claim 7, wherein the inorganic particles further comprise at least one of a bottom ash, fine sand, ceramic particles, glass particles, graphite fibers, carbon fibers, ceramic fibers, vermiculite fibers, basalt fibers, vallostonite fibers, or any combination thereof.

14. A synthetic lumber article comprising a composite material, the composite material comprising a polyurethane foam and a plurality of inorganic filler particles, wherein:
   the polyurethane foam is formed from at least one polyisocyanate, a first flexible polyether polyol having a first molecular weight and a functionality of about 3 or less, and a second rigid polyether polyol having a second molecular weight and a functionality of about 3 or greater, wherein the second molecular weight being less than the first molecular weight, and a wt % ratio of the first flexible polyol to the second rigid polyol ranges from about 1:1 to about 5:1;

the plurality of inorganic filler particles is present in an amount of about 50 wt % to about 85 wt % based on the total weight of the composite material, the inorganic filler particles including fly ash and glass fibers;

the composite material has a density in a range from about 30 lbs/ft$^3$ to about 52.1 lbs/ft$^3$; and the composite material has an average flexural stress of at least 2330 psi.

15. The synthetic lumber article of claim 14, adapted for use as a railroad tie, a roof shingle, a siding for homes, a fence post, a window frame, a door frame, or a replacement for ceramic and concrete building materials.

16. The synthetic lumber article of claim 14, wherein the composite material comprises a textured surface.

* * * * *